United States Patent [19]
McNair, Jr.

[11] 4,370,959
[45] Feb. 1, 1983

[54] TWO STROKE CYCLE ENGINE WITH SUSTAINED POWER STROKE

[75] Inventor: Robert J. McNair, Jr., Cincinnati, Ohio

[73] Assignee: Avco Corporation, Greenwich, Conn.

[21] Appl. No.: 154,744

[22] Filed: May 30, 1980

[51] Int. Cl.³ .............................................. F02B 17/00
[52] U.S. Cl. ................................. 123/295; 123/303;
123/430; 123/433; 123/600; 123/659
[58] Field of Search .............. 123/600, 662, 667, 659;
173/295, 303, 433, 430

[56] References Cited
U.S. PATENT DOCUMENTS

| 1,077,150 | 10/1913 | McCornack | 123/65 W |
|---|---|---|---|
| 2,662,516 | 12/1953 | Bodine, Jr. | 123/660 |
| 2,662,517 | 12/1953 | Bodine, Jr. | 123/660 |

*Primary Examiner*—Wendell E. Burns
*Attorney, Agent, or Firm*—Robert J. McNair, Jr.; Irwin P. Garfinkle

[57] ABSTRACT

A two-stroke cycle internal combustion engine has a sustained power stroke which results from delayed mixing of a stratified charge. Use of delayed mixing of an overall stoichiometric air-fuel mixture results in formation of a low amount of the oxides of nitrogen. Delayed mixing of a stratified charge is achieved by placement of a Helmholtz resonator cavity in the piston and peripherally just below the crown thereof. The Helmholtz resonator cavity communicates with the combustion chamber via a narrow slot made by undercutting the top edge of the piston. A port type intake valve is used. Pressurized air passing through the intake port during the exhaust phase of the cycle streams past the undercut top edge of the piston. After the engine cylinder has received a charge of fresh air the compression stroke is begun and the main chamber is filled with a slight fuel-rich gaseous charge. The companion Helmholtz resonator cavity receives only an air charge from the intake port. During the compression stroke some of the fuel-rich mixture is forced into the resonator cavity via the communicating slot. However, even at maximum compression the air-fuel mixture within the cavity remains lean. At or near TDC, the air-fuel mixture in the main chamber is ignited. As the flame front progresses across the chamber, a rapid increase in pressure serves not only to power the piston, but also to initiate a resonant reaction in the Helmholtz resonator cavity. This results in a transfer of the unburned gases therein into the main chamber, thereby sustaining the power stroke over a longer period than would occur when operating on a conventional Otto cycle.

14 Claims, 10 Drawing Figures

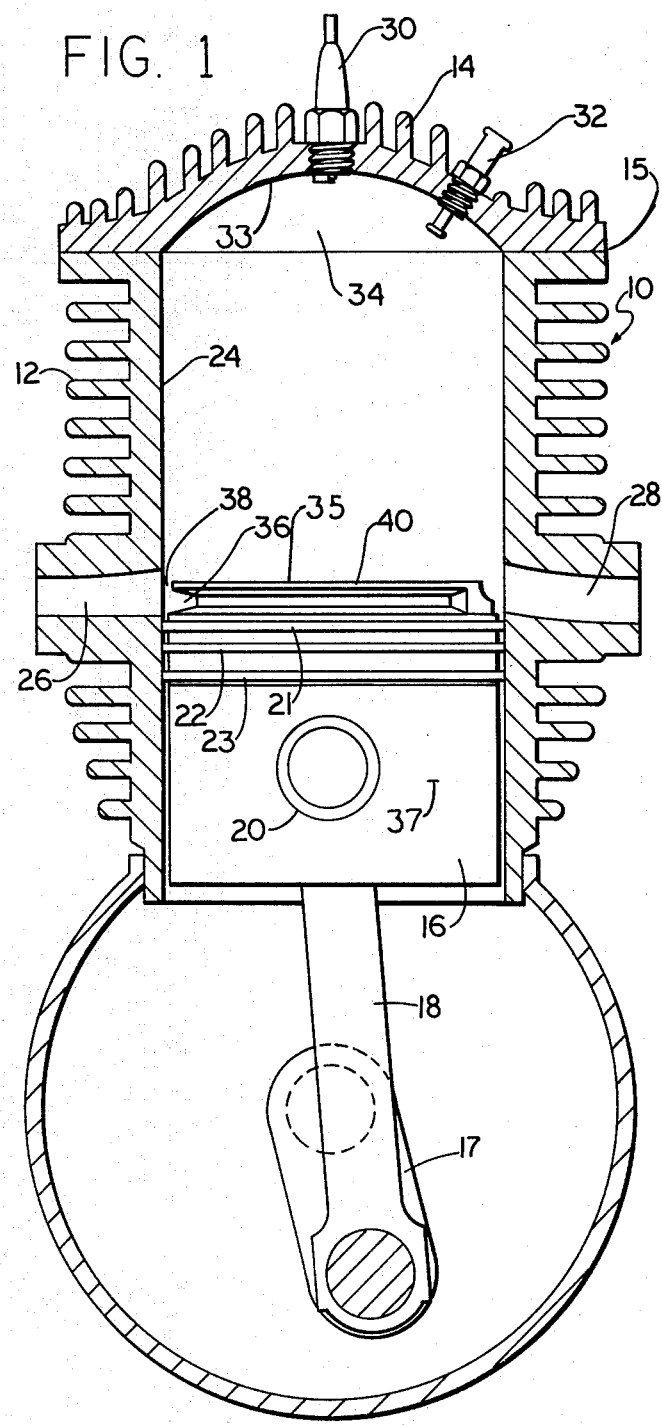
FIG. 1
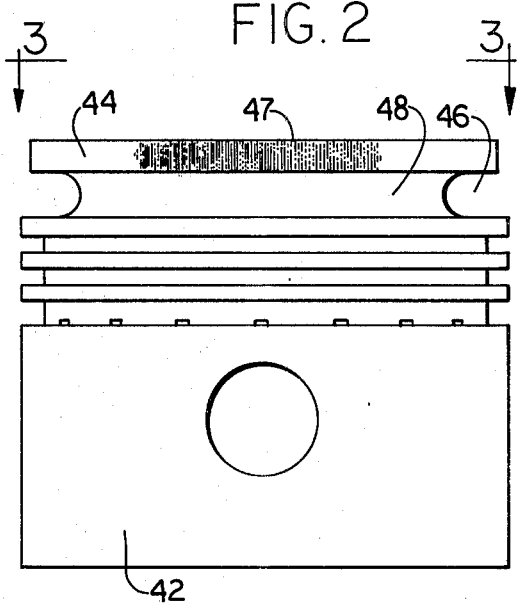
FIG. 2
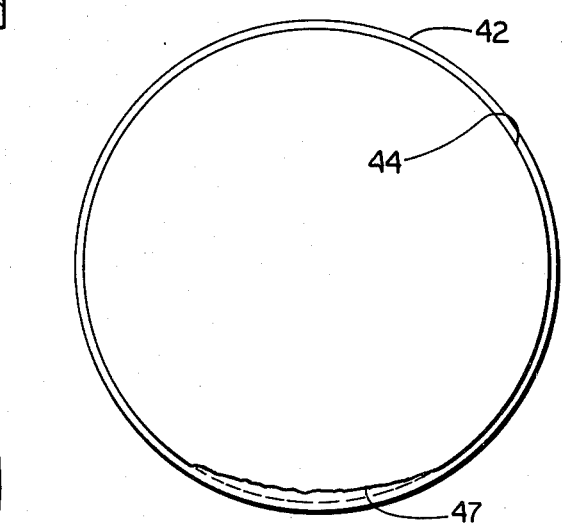
FIG. 3
FIG. 4

TWO STROKE CYCLE ENGINE WITH SUSTAINED POWER STROKE

DESCRIPTION

Background of Prior Art

This invention provides a two stroke cycle internal combustion engine having reduced emissions of harmful pollutants. To meet increasingly strict emission standards engine manufacturers have used catalytic converters and other types of thermal reactors. The literature describes engine research which seeks to reduce emissions without having to rely on such reactors. For example, the U.S. Department of Commerce publication No. DOP-TSC-OST-75-56 titled "Stratified Charge Engines" authored by Eric M. Withjack describes the operation of two open chamber stratified charge engines, the Ford Programmed Combustion Process (PROCO) engine, and the Texaco Controlled Combustion System (TCCS) engine. Work on a heat balanced engine is published in a paper entitled "The Controlled Heat Balanced Cycle," authored by R. F. Blaser, S. T. Hsu and R. A. Granger presented at the Twenty-seventh Meeting of the American Physical Society held at Pasadena, CA., 25-27 November, 1974. Other work on the heat balanced engine is described in U.S. Naval Academy publication Number EW 8-76 titled "The Naval Academy Heat Balanced Engine (NAHBE)," authored by R. Blaser, A. Pouring, B. Rankin and E. Keating, dated June 1976, and in U.S. Naval Academy publication EW-12-79 titled "Parametric Variations of a Heat Balanced Engine," authored by C. Faith, A. Pouring, B. Rankin and E. Keating, dated September, 1979.

A number of U.S. patents disclose internal combustion engines which achieve fuel mixture separation into rich and lean zones within the combustion chamber. These include Goto et al. (U.S. Pat. No. 3,987,776) who achieve separation by sequentially supplying air and then a fuel rich mixture by the same path, Winkler (U.S. Pat. No. 3,658,046) who uses centrifugal action to achieve a richer fuel mixture at the cylinder walls than at the central axis of the combustion chamber; and Blaser (U.S. Pat. No. 4,060,059) who achieves fuel mixture separation by adding additional air to the bottom of the combustion chamber at the end of the intake stroke leaving a fuel lean layer adjacent the top of the piston during the compression stroke.

McNair in U.S. Pat. No. 4,167,930, which is assigned to the same assignee as this invention, discloses means for progressively changing to a fuel-lean mixture within the cylinder during the power stroke portion of the cycle. Progressive change from a fuel-rich to a fuel-lean condition is achieved by means of a Helmholtz resonator cavity placed in the head or closed end of the combustion chamber. The Helmholtz resonator cavity communicates with the main combustion chamber through a narrow slit made around the periphery of the top end of the combustion chamber. During the intake stroke air is introduced into the combustion chamber through a cyclic pumping action determined by the geometry of the resonator and the dimensional characteristics of the slot.

This invention is an improvement over the heat balanced engine which has been described in the publication of the U.S. Naval Academy. A problem in the operation of this 4-stroke cycle engine is the tendency of the piston cap to erode as the result of high temperatures within the combustion chamber. The use of a two-stroke cycle engine allows the piston cap to be air cooled during every exhaust cycle of the engine. With the present engine configuration, reliable engine operation can be achieved while at the same time reducing the formation of nitric and nitrous oxides in the exhaust gases. Further, the combustion process can be carried to completion on every cycle, thereby reducing formation of both carbon monoxides and hydrocarbons.

BRIEF SUMMARY OF THE INVENTION

This invention pertains to a two-stroke cycle internal combustion engine wherein the fuel-air mixture within the cylinder is progressively changed during the power stroke portion of the cycle from a fuel-rich to a fuel-lean condition. To accomplish this a Helmholtz resonator cavity is located in the piston. The Helmholtz resonator cavity comprises an annular chamber between the top end of the piston and the first compression ring, and it communicates with the combustion chamber through a narrow slot formed between the cylinder wall and the peripheral edge at the top of the piston.

In accordance with this invention, an intake port is located in the cylinder wall adjacent the bottom dead center position of the piston. As the power stroke nears an end, and the piston approaches bottom dead center, both the intake and exhaust ports are uncovered. Pressurized air entering through the intake port sweeps combustion products from the chamber outward into the exhaust manifold. However, as the top end of the piston begins to uncover the intake port it is first viewable from the lower edge of the resonator cavity, and the air will flow into the cavity and sweep upward through the narrow slit between the cylinder wall and the top of the piston. The air flowing upward into the main chamber will cool the piston cap, removing a considerable amount of the heat gained during the preceding combustion stroke. As the piston continues downward it will gradually uncover more and more of the intake port. This allows the combustion chamber to be filled completely with a fresh charge of air by the time the piston reaches bottom dead center. By configuring the piston cap so that the resonator cavity does not extend through that region which is adjacent to the exhaust port there will be no communication between the resonator cavity and the exhaust port during the recharging cycle.

As the piston begins to move upward during the compression stroke the port valves will be covered and the compression cycle can begin. Early in the compression cycle a new charge of fuel will be injected into the combustion chamber. This charge of fuel will be injected generally onto the top central portion of the piston. Evaporation of the fuel during the compression phase will tend to further cool the piston cap.

Initially the resonator cavity will contain only air. During the compression stroke some of the rich air-fuel mixture in the main chamber will be forced into the resonator cavity via the communicating slot in the periphery of the piston. However, by the time the piston reaches top dead center, the air-fuel mixture within the resonator cavity will remain sufficiently lean so that combustion cannot occur within the cavity.

When the sparkplug ignites the rich fuel-air mixture in the main chamber at or near the end of the compression stroke, a flame front progresses across the combustion chamber. On reaching the communicating slot between the combustion chamber and the Helmholtz resonator, the flame will not propagate through the slot. Rather, the flame is quenched at the slot and only the pressure wave enters. The pressure wave, caused by the exothermic reaction of the combustion process, enters the slot causing a resonant reaction within the Helmholtz cavity. The cyclic phenomena associated with this resonance serves to transfer the lean fuel-air mixture from the resonator cavity into the main combustion chamber. The cyclic frequency of this pumping action is determined by the geometry of the resonator and the dimensional characteristics of the slot.

As more and more of the lean air-fuel mixture is brought from the resonator into the main chamber, two things are achieved. First, there is a spreading of the combustion process over a longer period of time. This reduces the maximum temperature reached during combustion, thereby reducing formation of nitric and nitrous oxides. Second, the addition of the lean air-fuel mixture allows the combustion process to be carried to completion thereby reducing formation of both carbon monoxide and hydrocarbons.

With our invention the piston cap is cooled at the end of each combustion stroke. First, the piston cap is cooled by the flow of air entering through the intake port. Secondly, cooling occurs due to the evaporation of fuel injected onto the top of the piston. As a result, the burden of cooling the piston does not depend upon conduction through the piston skirts into the cylinder wall or the spraying of an oil jet onto the bottom side of the piston. The result is a more reliable engine than was available with prior art implementations.

BRIEF DESCRIPTION OF THE DRAWINGS

FIG. 1 is a side elevation fragmentary view through a cylinder of a two-stroke cycle internal combustion engine of the air cooled type;

FIG. 2 is a side view of a piston for a prior art heat balanced engine;

FIG. 3 is a top view of the piston taken along line 2—2 of FIG. 2 and showing the effects of heat erosion of the cap;

FIG. 4 is a view of the top of the piston used in the engine depicted in FIG. 1;

DETAILED DESCRIPTION OF THE INVENTION

Figure 5:
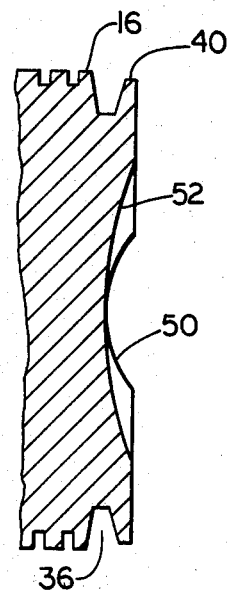
FIG. 5 is a cross sectional view of the piston taken along line 4—4 of FIG. 4.

FIG. 1 shows one cylinder of an air cooled two-stroke cycle engine 10. Engine 10 may include one or more cylinder members 12, each having a head member 14 fitted thereto, using a head gasket 15 of conventional configuration. A piston 16 is carried in each cylinder 12. The reciprocating motion of piston 16 is converted to circular motion of the crankshaft 17 by means of connecting rod 18. Connecting rod 18 attaches to piston 16 by means of wrist pin 20. Piston rings 21, 22, and 23 maintain both compression and proper lubrication of cylinder wall 24. Cylinder 12 has an intake port 26 and an exhaust port 28. A spark plug 30 is in a hemispherical dome 33 which forms a part of head 14. Fuel injector 32 extends through head member 14.

For the engine cylinder shown in FIG. 1 the volume at the closed end of the combustion chamber consists of two parts. First, there is a main combustion chamber 34 which extends from the dome 33 to the crown 35 of the piston 16. Second, the combustion chamber includes a Helmholtz resonator cavity 36 which is formed in and around the periphery of the cylindrical piston body 37 below the crown 35. Communication between the main combustion chamber 34 and the Helmholtz resonator cavity 36 is through a narrow circumferential slot 38 formed between cylinder wall 24 and the top edge 40 of the piston.

In FIG. 1 the position of piston 16 is shown nearing bottom dead center. If we assume that fresh air is filling both the main chamber 34 and the Helmholtz resonator 36, the engine will be ready for the compression stroke to start. As crank 17 moves in a clockwise position, piston 16 will move upward. As soon as piston 16 rises sufficiently to cover both ports 26 and 28 fuel may be injected through fuel injector 32. If injection is accomplished in the first half of the compression stroke, medium pressure injection valves may be used. During the latter stages of the compression stroke there will be a fuel rich mixture within the main chamber 34 and a fuel lean mixture in Helmholtz resonator cavity 36. When at the top dead center position, the Helmholtz resonator cavity 36 will typically have half the volume of the main combustion chamber 34.

After firing of spark plug 30 the engine will operate in the sustained power stroke mode. The pressure volume curve of the sustained power stroke mode differs from the conventional Otto cycle (see for example, Mechanical Engineers' Handbook, edited by T. Baumeister, Sixth Edition, McGraw-Hill Book Co., Inc., page 9-105). Because of the Helmholtz resonator cavity 36, the peak portion of the pressure volume curve is not smooth. Rather, there is a ripple effect superimposed on the peak portion of the curve. The time duration of each cycle of the ripple is relatable to the resonant frequency of the Helmholtz cavity. Dimensional constraints of slot 38 include both the cross sectional area of the slot and its depth. The width of the slot (a minimal 0.10") must be narrow enough so that the flame in the main combustion chamber is quenched at the slot. However, the overall cross sectional area must be sufficiently large to enable attainment of stable conditions at the end of the compression stroke for an engine running at rated cruise speed.

The depth of the slot 38 is sized in wavelengths for the wave front which reaches the cylinder edge after the flame front has propagated away from the ignition by spark plug 30. Propagation velocity and the acoustic phenomonen related to ignition of the fuel charge in an engine cylinder is described in detail in U.S. Pat. No. 2,573,536 to Bodine so it will not be described here. However, from the teaching of Bodine it can be inferred that the propagational velocity which pertains as the flame front progresses across the main chamber, is approximately five times the acoustic velocity in air at atmospheric pressures. Therefore, the depth of edge 40 at the top of the piston should be sized between 0.20" and 0.25".

FIGS. 2 and 3 show one of the problems of the prior art heat balanced engine. Under unbalanced fuel-air mixture conditions, the erosion of the material of the pressure exchange cap results. Test findings relating to the problem are described in U.S. Naval Academy Publication No. EW—79 titled "Materials Analysis for Selection of Alloys for the NAHBE Pressure Exchange Cap" authored by D. F. Hasson, dated May 1979. As related in the above report, erosion of the piston cap occurs when peripheral temperatures reach 850° F. The deterioration result is depicted in FIGS. 2 and 3. Piston 42 has a pressure cap lip 44 which encloses Helmholtz resonator cavity 46. When piston 42 is inserted in a cylinder the Helmholtz resonator cavity is formed between an undercut area 48 of the piston and the circumscribing piston wall. Operation at high temperatures results in erosion of lip 44 as shown in region 47 of FIGS. 2 and 3. Experience has shown that once erosion begins, further and more rapid degradation of the piston results.

As viewed in FIGS. 4 and 5, a piston 16 has a flat crown area 41 and a central area 52 is hollowed out in a generally spherical shape and a depression 50 made in the crown of the piston. To establish the width of the slot 38 the radius at the top edge 40 is less than that of the main body of the piston 16 by an amount d. In practice d is nominally 0.80" to 0.10". With the piston oriented in engine 10 as shown in FIG. 1, depression 50 will be aligned with exhaust port 28 of the cylinder. Depression 50 assures that all cylinder gases will be exhausted through the exhaust port when the piston is in its bottom dead center region.

Helmholtz cavity 36 does not extend all of the way around the piston. As may be seen in FIGS. 4 and 5, the Helmholtz cavity terminates prior to the region adjacent exhaust port 28.

The sequence of events which occur when piston 16 is near its bottom-most position is shown in FIGS. 6, 7, 8 and 9. Only the intake portion of piston 16 is shown since the depression region 50 of the piston 16 uncovers exhaust port 28 during the illustrated portions of the downward stroke. Uncovering of the exhaust port 28 allows the products of combustion to be purged from chamber 34. It is assumed that engine 10 has some form of pressurized air available at the intake 26. This pressurized air may come from a turbocharger or it can be obtained from pressurization of the crankcase on the downward stroke of the piston.

Figure 6:
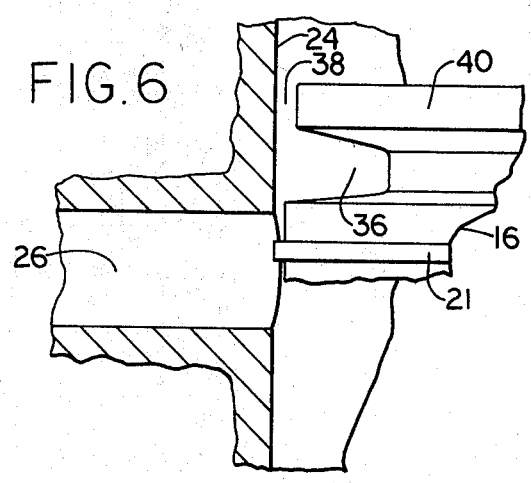
FIG. 6 is a partial view of the FIG. 1 engine showing the crown of the piston above the intake port.
Figure 7:
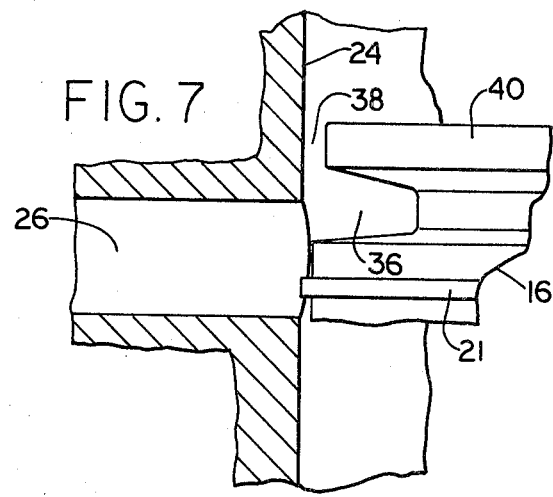
FIG. 7 is a partial view of the FIG. 1 engine showing the crown of the piston partially uncovering the intake port.
Figure 9:
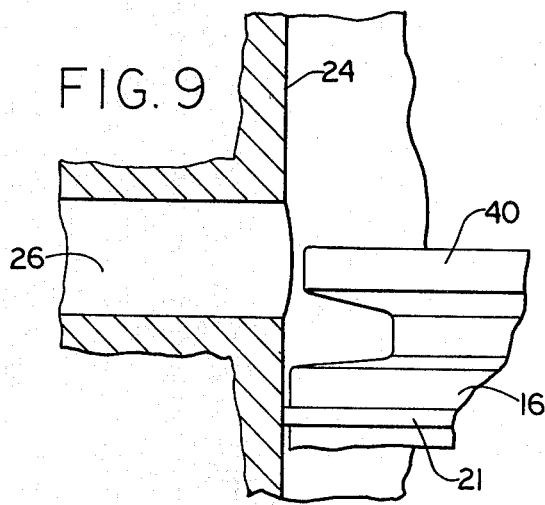
FIG. 9 is a partial view of the FIG. 1 engine showing the crown of the piston in the bottom dead center position which results in complete uncovering of the intake port.
Figure 8:
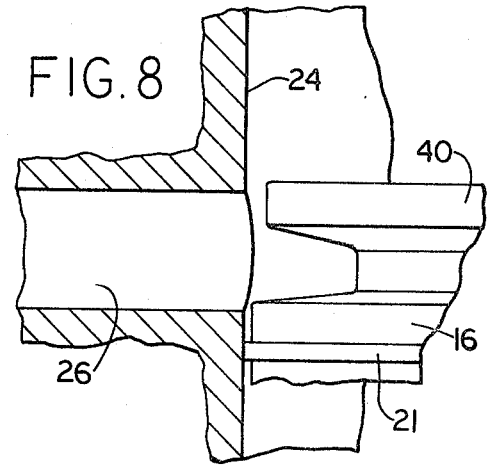
FIG. 8 is a partial view of the FIG. 1 engine showing the crown of the piston almost completely uncovering the intake port.

In the piston position shown in FIG. 6, piston 16 blocks off the end of intake port 26. As the piston 16 moves downward to the position shown in FIG. 7, the pressurized air in intake port 26 begins to enter the cylinder 12 (see FIG. 1) through the Helmholtz resonator cavity 36. The pressurized air coming through the port escapes upward through gap 38, between cylinder wall 24 and piston edge 40. The air will escape into the cylinder around most of the periphery of gap 38 (see FIG. 1), and act to establish a curtain of air around the periphery of cylinder wall 24. This curtain of air accomplishes two things. First, it flushes out the burned gases remaining from the previous power stroke. Second, the incoming air cools off the crown of the piston in the region immediately adjacent edge 40. During the interval when the piston is moving from the location shown in FIG. 7 to that shown in FIG. 8, there is a continuing flow of cooling air past the top edge of the piston. Finally, in FIG. 9 there is shown the condition which pertains when piston 16 reaches its most downward position. The top edge of piston 16 is below the upper edge of the intake port. This allows a full charge of fresh air to be injected into the cylinder chamber.

As crankshaft 17 (see FIG. 1) continues to rotate, piston 16 will move upward. As soon as the piston 16 reaches the FIG. 6 position on the compression stroke injection of a fuel charge is begun through injector 32 (see FIG. 1). With fuel injection commencing during the early portion of the compression stroke, it is possible to utilize a medium pressure fuel injection system. In our implementation fuel is injected so that it sprays onto hemispherical region 52 (see FIG. 4). Fuel evaporating from the hot crown of the piston further cools the top piston 16.

At the completion of the compression stroke the rich fuel-air mixture in the main chamber 34 is ignited by spark plug 30. On ignition, a flame front progresses across the hemispherical combustion chamber. On reaching the communicating slot 38 between the main chamber and the Helmholtz cavity 36, the flame will not propagate through the slot. Rather, the flame is quenched at the slot and only the pressure wave enters. The pressure wave is caused by the exothermic reaction of the fuel in the combustion process. The pressure wave creates a cyclic resonant reaction within cavity 36. The cyclic phenomena serves to transfer the lean fuel-air mixture within the cavity outward through slot 38 into the main combustion chamber. As more and more of the lean air-fuel mixture is brought from the resonator into the main chamber, two things are achieved. First, there is a spreading of the combustion process over a longer period of time. This reduces the maximum temperature reached during combustion, thereby reducing formation of nitric and nitrous oxides. Second, the addition of the lean air-fuel mixture allows the combustion process to be carried to completion, thereby reducing formation of both carbon monoxide and hydrocarbons.

Figure 10:
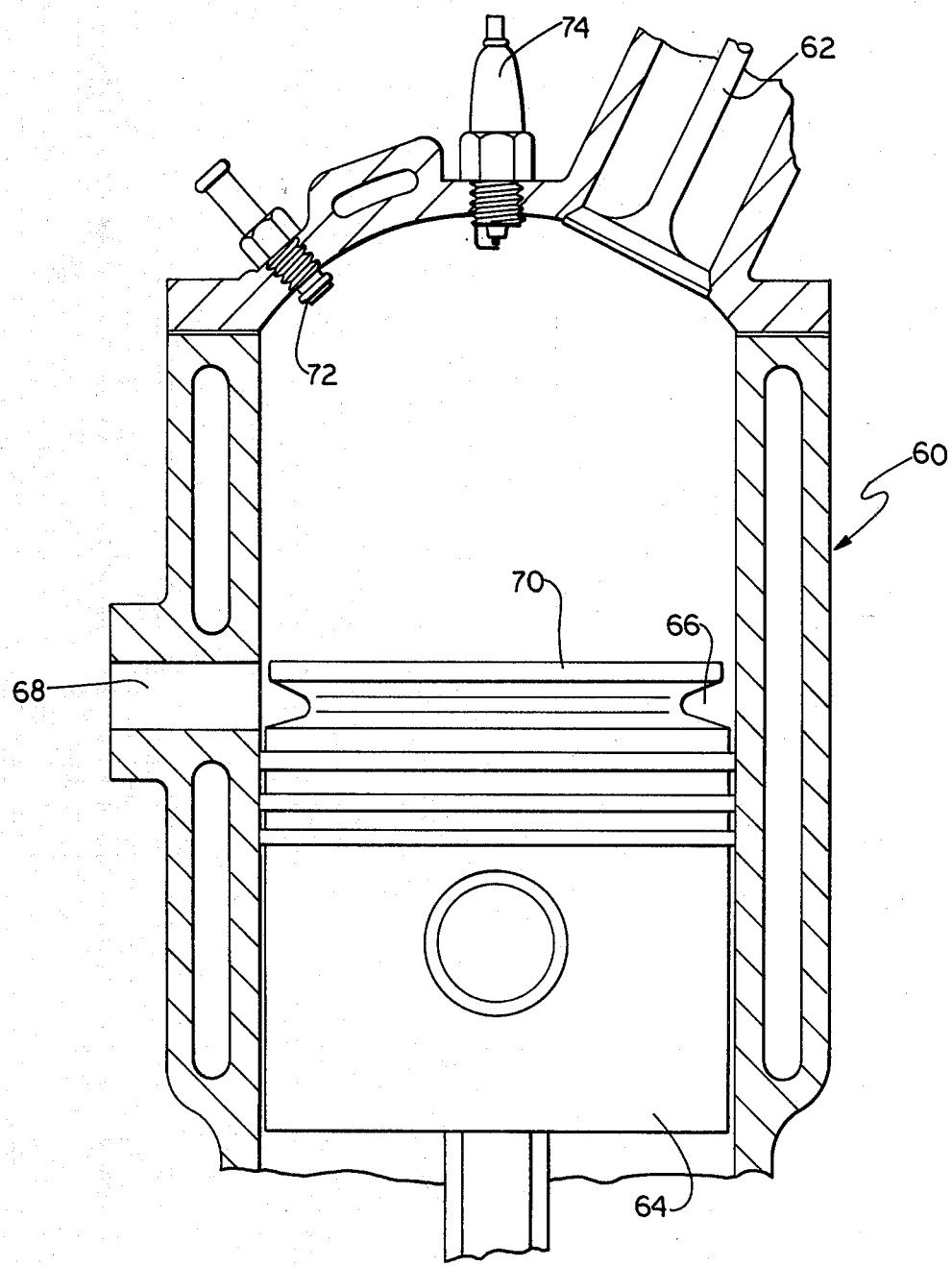
FIG. 10 is a side elevation fragmentary view through a cylinder of a liquid cooled two-stroke cycle internal combustion engine having the exhaust valve in the top of the chamber.

A liquid cooled two-stroke cycle engine 60 is shown in FIG. 10. Engine 60 differs from that shown in FIG. 1 in that it has an exhaust valve 62 in the top end of the combustion chamber rather than the port exhaust valve 28 shown in FIG. 1. For the case where the exhaust valve 62 is used, the crown of piston 64 can utilize a Helmholtz resonator cavity 66 which extends symmetrically around the crown of the piston. The FIG. 10 engine will function generally the same as the FIG. 1 engine. Pressurized air entering through the intake port 68 will film cool piston edge 40 at the top of the piston. Exhaust valve 62 will open whenever piston 64 is in the bottom dead center region of the stroke. Exhaust valve 62 will close as soon as the piston begins the compression stroke. With valve 62 closed, fuel injection from injector 72 can begin. Near the top dead center position of the piston the fuel charge is ignited by means of spark plug 74. A piston of the type shown in the FIG. 10 implementation can be milled on a lathe from a casting blank.

While only two forms of the invention have been shown it is recognized that other forms and variations will occur to those skilled in the art. For example, other means of injecting fuel into the main chamber might also be considered. The main feature of the invention is that the top of the piston is film cooled during every cycle of its operation. Air brought in through the intake port cools the piston in a way that has not been possible with previous implementations of the heat balanced engine. Further, the initial charge of air in the Helmholtz resonator cavity contains no fuel. This assures that there will always be a lean mixture within the cavity at the time the fuel in the main chamber is ignited. Therefore, while the preferred form of the invention has been concisely illustrated in order to explain the principles of the invention, it is not our intention to limit or narrowly described the invention beyond the broad concept set forth in the appended claims.

I claim:

1. A two stroke cycle internal combustion engine of the type wherein there is included at least one cylinder member, a piston within the cylinder member reciprocable through a predetermined stroke volume, a cylinder head formed to provide a main combustion chamber closed at one end, the other end of said combustion chamber being the crown of said piston, said piston being movable within the sidewalls of said cylinder member from a top dead center position wherein said crown is adjacent said cylinder head to a bottom dead center position wherein said crown is remote from said cylinder head, the invention comprising:

fuel injection means for supplying a fuel-rich mixture to the main combustion chamber during the compression stroke wherein the piston moves to minimize the volume in the main chamber;

firing means for igniting the fuel-rich mixture near the top dead center position of the piston to bring about a power stroke preceded by a flame front propagating across the main chamber from an ignition point;

exhaust means for permitting the exhaust gases to escape the main combustion chamber near the end of the power stroke wherein the piston moves to the bottom dead center position;

a resonator cavity formed in and around the periphery of the piston at a location below the crown, said cavity being in communication with the main combustion chamber via a narrow circumferential slot formed between said cylinder wall and the top edge of said piston;

an intake port through said cylinder wall adjacent the crown of said piston as said piston approaches its bottom dead center position, said intake port being open when said piston is adjacent its bottom dead center position, said intake port being closed when said piston is not adjacent said bottom dead center position; and means for supplying air to said main chamber and said resonator cavity through said intake port during the period said piston is adjacent said bottom dead center position, said period being at the conclusion of the power stroke of said engine, said air supplying means causing air to flow through said resonator cavity and said chamber and over said piston crown and through said exhaust means at the conclusion of each power stroke thereby serving to cool the crown of said piston during each recharging of the main chamber.

2. The invention as described in claim 1 wherein the exhaust means comprises:

an exhaust port in the sidewall of said cylinder member at a location generally opposite said intake port; and a depression in the crown of said piston, said depression being aligned with said exhaust port thereby assuring that all cylinder gases are exhausted through said exhaust port when said piston is in the bottom dead center region.

3. The invention as described in claim 2 wherein the resonator cavity terminates prior to the region adjacent the depression in the piston crown.

4. The invention as defined in claim 1 wherein said resonator cavity is a Helmholtz resonator cavity.

5. The invention as described in claim 1 wherein the exhaust means comprises an exhaust valve in the head end of the main combustion chamber, said exhaust valve being actuated to allow escape of the combustion products at the end of each power stroke.

6. The invention as defined in claim 5 wherein said resonator cavity is a Helmholtz resonator cavity.

7. The invention as described in claim 1 wherein the fuel injecting means is in the form of a medium pressure fuel injector.

8. The invention as described in claim 1 wherein the means for supplying air to said main chamber and said cavity includes a turbocharger for providing a source of pressurized air.

9. The invention as described in claim 1 wherein the crown of the piston is hollowed in the central area to provide a generally spherical zone in the top end of said piston.

10. The invention as described in claim 1 wherein the cylinder head is formed to provide a hemispherically domed combustion chamber.

11. The invention as described in claim 1 wherein the volume of the resonator cavity is at least half the minimum volume attained by the main combustion chamber when the piston is at its top dead center position.

12. The invention as described in claim 1 wherein the width of the communicating slot between the sidewall of the cylinder and the top lip of the piston is less than 0.1 inches.

13. The invention as described in claim 1 wherein the communicating slot has a uniform depth.

14. The invention as described in claim 13 wherein the depth of the communicating slot is between 0.2 and 0.25 inches.

* * * * *